(12) United States Patent
Miyamoto et al.

(10) Patent No.: US 9,309,335 B2
(45) Date of Patent: Apr. 12, 2016

(54) PROCESS FOR PRODUCING POLYTETRAFLUOROETHYLENE FINE POWDER

(75) Inventors: Masayoshi Miyamoto, Settsu (JP); Taku Yamanaka, Settsu (JP); Yasuhiko Sawada, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 13/810,323

(22) PCT Filed: Sep. 29, 2011

(86) PCT No.: PCT/JP2011/073039
§ 371 (c)(1),
(2), (4) Date: Jan. 15, 2013

(87) PCT Pub. No.: WO2012/043881
PCT Pub. Date: Apr. 5, 2012

(65) Prior Publication Data
US 2013/0122302 A1    May 16, 2013

Related U.S. Application Data

(60) Provisional application No. 61/388,550, filed on Sep. 30, 2010.

(51) Int. Cl.
| C08F 14/26 | (2006.01) |
| C08F 2/20 | (2006.01) |
| C08F 114/26 | (2006.01) |
| C08J 3/16 | (2006.01) |
| C08F 214/26 | (2006.01) |

(52) U.S. Cl.
CPC . *C08F 14/26* (2013.01); *C08F 2/20* (2013.01); *C08F 114/26* (2013.01); *C08J 3/16* (2013.01); *C08F 214/26* (2013.01); *C08J 2327/18* (2013.01); *Y10T 428/2982* (2015.01)

(58) Field of Classification Search
CPC .......... C08F 14/26; C08F 2/20; C08F 114/26; C08F 214/26; C08J 3/16; C08J 2327/18; Y10T 428/2982
USPC ........................................................ 428/402
See application file for complete search history.

(56) References Cited

U.S. PATENT DOCUMENTS

| 2,075,628 A | 3/1937 | Sekavec |
| 2,593,583 A * | 4/1952 | Lontz ............... 528/502 F |
| 4,107,232 A | 8/1978 | Haaf et al. |
| 4,355,126 A | 10/1982 | Haaf et al. |
| 4,368,296 A | 1/1983 | Kuhls et al. |
| 4,391,935 A | 7/1983 | Bialous et al. |
| 4,408,007 A | 10/1983 | Kuhls et al. |
| 4,649,168 A | 3/1987 | Kress et al. |
| 4,751,260 A | 6/1988 | Kress et al. |
| 4,767,821 A | 8/1988 | Lindner et al. |
| 4,810,739 A | 3/1989 | Lindner et al. |
| 4,920,166 A | 4/1990 | Buysch et al. |
| 4,983,658 A | 1/1991 | Kress et al. |
| 4,999,115 A | 3/1991 | Peterson |
| 5,061,745 A | 10/1991 | Wittmann et al. |
| 5,242,960 A | 9/1993 | Ostlinning et al. |
| 5,804,654 A | 9/1998 | Lo et al. |
| 6,300,408 B1 | 10/2001 | Asano et al. |
| 6,422,736 B1 | 7/2002 | Antoniades et al. |
| 6,503,988 B1 * | 1/2003 | Kitahara et al. ............ 525/326.2 |
| 7,220,456 B2 | 5/2007 | Mehta et al. |
| 2006/0173100 A1 | 8/2006 | Lee et al. |
| 2006/0252898 A1 | 11/2006 | Tsuji et al. |
| 2008/0020159 A1 | 1/2008 | Taira et al. |
| 2008/0275188 A1 * | 11/2008 | Park ............................ 525/199 |
| 2009/0011351 A1 | 1/2009 | Kikawa et al. |
| 2011/0021728 A1 | 1/2011 | Higuchi et al. |
| 2011/0040054 A1 | 2/2011 | Higuchi et al. |
| 2011/0105649 A1 | 5/2011 | Harada et al. |
| 2011/0196080 A1 | 8/2011 | Matsuoka et al. |
| 2011/0201730 A1 | 8/2011 | Tsunoda et al. |
| 2013/0184395 A1 | 7/2013 | Yamanaka et al. |
| 2013/0184401 A1 | 7/2013 | Miyamoto et al. |
| 2014/0336315 A1 | 11/2014 | Yamanaka et al. |

FOREIGN PATENT DOCUMENTS

| CA | 1045269 | 12/1978 |
| EP | 0 861 856 A1 | 9/1998 |
| EP | 861856 * | 9/1998 |

(Continued)

OTHER PUBLICATIONS

International Preliminary Report on Patentability, together with the Written Opinion of the International Searching Authority, dated Apr. 2, 2013 for PCT/JP2011/073039.

International Preliminary Report on Patentability, together with the Written Opinion of the International Searching Authority, dated Apr. 9, 2013 for PCT/JP2011/072453.

International Preliminary Report on Patentability, together with the Written Opinion of the International Searching Authority, dated Apr. 9, 2013 for PCT/JP2011/072446.

International Search Report with a mailing date of Dec. 27, 2011 for PCT/JP2011/072446.

International Search Report with a mailing date of Jan. 10, 2012 for PCT/JP2011/072453.

(Continued)

*Primary Examiner* — Leszek Kiliman
(74) *Attorney, Agent, or Firm* — Sughrue Mion, PLLC (57) ABSTRACT

A process for producing a polytetrafluoroethylene fine powder including: (1) a step of preparing an aqueous dispersion containing polytetrafluoroethylene, water and a surfactant (A); (2) a step of initiating coagulation of the polytetrafluoroethylene in said aqueous dispersion by agitating said aqueous dispersion; (3) a step of adding a surfactant (B) after the step (2); (4) a step of terminating coagulation after the step (3); (5) a step of collecting a wet powder of the polytetrafluoroethylene; and (6) a step of drying the wet powder of the polytetrafluoroethylene.

8 Claims, 3 Drawing Sheets

(56) References Cited

FOREIGN PATENT DOCUMENTS

| | | | |
|---|---|---|---|
| EP | 1 702 932 A1 | | 9/2006 |
| EP | 1702932 | * | 9/2006 |
| EP | 2 623 543 A1 | | 8/2013 |
| EP | 2 623 556 A1 | | 8/2013 |
| GB | 1 459 648 | | 12/1976 |
| JP | 49-115190 A | | 11/1974 |
| JP | 50-44241 | | 4/1975 |
| JP | 56-131629 A | | 10/1981 |
| JP | 59-36657 B2 | | 9/1984 |
| JP | 60-38418 B2 | | 8/1985 |
| JP | 60-258263 A | | 12/1985 |
| JP | 61-55145 A | | 3/1986 |
| JP | 61-127759 A | | 6/1986 |
| JP | 61-261352 A | | 11/1986 |
| JP | 62-58629 B2 | | 12/1987 |
| JP | 63-278961 A | | 11/1988 |
| JP | 1-60181 B2 | | 12/1989 |
| JP | 2-32154 A | | 2/1990 |
| JP | 5-186686 A | | 7/1993 |
| JP | 5-214184 A | | 8/1993 |
| JP | 5-287151 A | | 11/1993 |
| JP | 6-306212 A | | 11/1994 |
| JP | 7-324147 A | | 12/1995 |
| JP | 8-253600 A | | 10/1996 |
| JP | 9-95583 A | | 4/1997 |
| JP | 10-77378 A | | 3/1998 |
| JP | 10-147617 | * | 6/1998 |
| JP | 10-259252 A | | 9/1998 |
| JP | 10-310707 A | | 11/1998 |
| JP | 2005-2322 A | | 1/2005 |
| WO | 97/17382 A1 | | 5/1997 |
| WO | 2004/074371 A1 | | 9/2004 |
| WO | 2006/054612 A1 | | 5/2006 |
| WO | WO2007/046377 | * | 4/2007 |
| WO | WO2007/049517 | * | 5/2007 |
| WO | 2009/128432 A1 | | 10/2009 |
| WO | WO2009/128432 | * | 10/2009 |
| WO | 2009/142080 A1 | | 11/2009 |
| WO | WO2009/142080 | * | 11/2009 |
| WO | 2011/055824 A1 | | 5/2011 |

OTHER PUBLICATIONS

Extended European Search Report dated Mar. 2, 2015, issued by the European Patent Office in counterpart European Application No. 11829431.3.

Communication dated Feb. 11, 2015, issued by the European Patent Office in European Application No. 11829307.5.

* cited by examiner

PROCESS FOR PRODUCING POLYTETRAFLUOROETHYLENE FINE POWDER

CROSS-REFERENCE TO RELATED APPLICATION

This application is a National Stage of International Application No. PCT/JP2011/073039 filed Sep. 29, 2011, claiming priority based on U.S. Provisional Application No. 61/388,550, filed Sep. 30, 2010, the contents of all of which are incorporated herein by reference in their entirety.

TECHNICAL FIELD

The present invention relates to a process for producing a polytetrafluoroethylene fine powder.

BACKGROUND ART

Polytetrafluoroethylene (PTFE) is polymerized in mainly two types of processes: suspension polymerization and aqueous dispersion (emulsion) polymerization. In latex obtained by aqueous dispersion (emulsion) polymerization, polymer fine particles are aggregated and dried to obtain powder (fine powder), which is then processed by paste extrusion after being compounded mainly with a liquid lubricant. By paste extrusion, the compound is extruded into a form of a rod or a tube from an extruder. The extruded articles are used as sealing materials without being subjected to further processing or by being rolled into a sheet without sintering (calendering), or as filter materials by being stretched into porous films, or are further sintered to be used as molded articles such as tubes, and wire-coatings.

When a high shear force is applied to PTFE aqueous dispersions, primary particles are aggregated and secondary particles having average particle size of 100 to 1000 μm are formed (coagulation). It is known that in order to promote coagulation an additive such as acids, alkalis, organic solvents is added. Secondary particle powder obtained by coagulation of PTFE aqueous dispersions is dried to give PTFE fine powder.

PTFE fine powder is characterized by its fibrillating properties. By paste extrusion or calendering as described above, molded articles such as sealing materials, filters, tubes, pipes, wire-coatings can be produced.

Although the above properties of PTFE fine powder may be advantageous, some problems may also be caused such that the secondary particle powder is tend to be aggregated due to fibrillation and that the formed aggregates may not restore the original secondary particle powder. Because of these problems, PTFE fine powder is tend to be aggregated or aggregated to be consolidated during production, transport or molding processes thereof, impairing handling characteristics thereof.

The aggregates may lead to reduced molding properties and deteriorated appearance of molded articles. Thus, it is usually necessary to remove the aggregates with a sieve during production or before molding. They may lead to decreased working efficiency or productivity.

Patent Document 1 discloses a process for producing a fine powder having a high apparent density and excellent flowability by adding a fluorine-containing anionic surfactant to a PTFE aqueous dispersion.
Patent Document 1: WO 97/17382

According to the process disclosed in Patent Document 1, polytetrafluoroethylene (PTFE) fine powder have an increased apparent density, so that PTFE fine powder has increased flowability as well as improved handling characteristics. However, molding PTFE fine powder having a high apparent density by paste extrusion requires high extrusion pressure, which may impair molding properties.

DISCLOSURE OF THE INVENTION

Accordingly, an object of the present invention is to provide a process for producing a PTFE fine powder having superior handling characteristics despite of a low apparent density.

The present inventors have unexpectedly found that an addition of a surfactant at a specific time during a coagulation step in the production of PTFE fine powder improves handling characteristics of the resulting PTFE fine powder to achieve the present invention.

Thus, the present invention is a process for producing a polytetrafluoroethylene fine powder, the process including:
(1) a step of preparing an aqueous dispersion containing polytetrafluoroethylene, water and a surfactant (A);
(2) a step of initiating coagulation of the polytetrafluoroethylene in the aqueous dispersion by agitating the aqueous dispersion;
(3) a step of adding a surfactant (B) after the step (2);
(4) a step of terminating coagulation after the step (3);
(5) a step of collecting a wet powder of the polytetrafluoroethylene; and
(6) a step of drying the wet powder of the polytetrafluoroethylene.

The surfactant (B) is preferably a nonionic surfactant.
In the step (3), preferably 1 ppm to 10% by mass of the surfactant is added to the polymer in the aqueous dispersion.
The present invention is also a polytetrafluoroethylene fine powder obtained by the above process.
The process of the present invention allows production of PTFE fine powder having a low compression ratio and aggregate disintegration degree as well as superior handling characteristics. According to the present process, the resulting PTFE fine powder has an equivalent apparent density to conventional fine powder.

BRIEF DESCRIPTION OF THE DRAWINGS

FIG. 4 is a schematic view of examples of cone-shaped impellers, in which
FIG. 4(a) is an upward cone-shaped impeller,
FIG. 4(b) is a downward cone-shaped impeller,
FIG. 4(c) is a frontal coupling cone-shaped impeller,
and FIG. 4(d) is a double cone-shaped impeller having a disc saw.

BEST MODE FOR CARRYING OUT THE INVENTION

The process of the present invention comprises the step (1) of preparing an aqueous dispersion comprising polytetrafluoroethylene (PTFE), water and a surfactant (A).
The PTFE has fibrillating properties and non-melt secondary processability. The PTFE preferably has a standard specific gravity (SSG) of 2.13 to 2.23. The PTFE preferably has a melting point of 325 to 347° C. The melting point is measured by differential scanning calorimetry (DSC) with the heating rate of 10° C./min. The PTFE preferably has average primary particle size of 0.05 to 1 µm.

The PTFE may be a tetrafluoro-ethylene (TFE) homopolymer consisting solely of TFE or a modified PTFE composed of TFE and a modifying monomer. The modifying monomer may be any monomer that can be copolymerized with TFE and include perfluoroolefins such as hexafluoropropylene (HFP); chlorofluoroolefins such as chlorotrifluoroethylene (CTFE); hydrogen-containing fluoroolefins such as trifluoroethylene, vinylidene fluoride (VDF); perfluorovinyl ethers; perfluoroalkyl ethylenes; ethylene and the like. One or more modifying monomers may be used.

The perfluorovinyl ethers are not specifically limited and include perfluorinated unsaturated compounds represented by the following general formula (1):

$$CF_2=CF-ORf \qquad (1)$$

wherein, Rf is a perfluorinated organic group. As used herein, "perfluorinated organic group" means an organic group in which all hydrogen atoms linked to a carbon atom(s) are substituted with fluorine atoms. The perfluorinated organic group may contain an ethereal oxygen atom.

The perfluorovinyl ethers may include perfluoro(alkyl vinyl ethers) (PAVEs) which correspond to the above general formula (1) wherein Rf is a perfluoroalkyl group having 1 to 10 carbon atoms. The perfluoroalkyl group preferably has 1 to 5 carbon atoms.

The perfluoroalkyl group in the above PAVEs may include perfluoromethyl, perfluoroethyl, perfluoropropyl, perfluorobutyl, perfluoropentyl, perfluorohexyl groups and the like. The PAVEs are preferably perfluoropropyl vinyl ether (PPVE) which has a perfluoropropyl group as the perfluoroalkyl group. The perfluorovinylethers may further include the ones having the above general formula (1) in which Rf is a perfluoro(alkoxyalkyl) group having 4 to 9 carbon atoms; in which Rf is the group represented by the following formula:

wherein m is 0 or an integer of 1 to 4; and in which Rf is the group represented by the following formula:

wherein n is an integer of 1 to 4 and the like.

The perfluoroalkyl ethylenes are not specifically limited and may include perfluorobutyl ethylene (PFBE), perfluorohexyl ethylene and the like.

The modifying monomer in the modified PTFE is preferably at least one selected from the group consisting of HFP, CTFE, VDF, PPVE, PFBE and ethylene. It is more preferably at least one monomer selected from the group consisting of HFP and CTFE.

The modified PTFE preferably comprises 1% by mass or less, more preferably from 0.001 to 1% by mass of the modifying monomer unit relative to total monomer units therein.

As used herein, the modifying monomer unit is the moiety which is a part of the molecular structure of the modified PTFE and is derived from the modifying monomer. The total monomer units mean the moiety which is derived from all monomers in the molecular structure of the modified PTFE.

The surfactant (A) is preferably at least one selected from the group consisting of anionic surfactants, fluorine-containing anionic surfactants, nonionic surfactants and fluorine-containing nonionic surfactants, more preferably at least one selected from the group consisting of fluorine-containing anionic surfactants and nonionic surfactants. It is still more preferably a fluorine-containing anionic surfactant. The present process is still efficacious when the fluorine-containing surfactant (including fluorine-containing anionic surfactants and fluorine-containing nonionic surfactants) having 7 or less or 6 or less carbon atoms is used as the surfactant (A) to carry out polymerization of the PTFE fine powder.

The fluorine-containing anionic surfactants include carboxylic surfactants, sulfonic surfactants and the like. The fluorine-containing anionic surfactants are preferably the carboxylic surfactants represented by the following general formula (i), (ii), (iii), (iv), (v), (vi) or (vii).

The fluorine-containing anionic surfactants may include the carboxylic surfactants represented by the general formula (i):

$$X-Rf^1COOM^1 \qquad (i)$$

wherein X is H, F or Cl; $Rf^1$ is a linear or branched fluoroalkylene group having 4 to 14, preferably 5 to 7 carbon atoms, for example, a linear or branched fluoroalkylene group having 7 carbon atoms and, inter alia, is a linear or branched perfluoroalkylene group; and $M^1$ is a monovalent alkali metal, $NH_4$ or H.

The carboxylic surfactants represented by the general formula (i) may include $C_5F_{11}COOH$, $C_6F_{13}COOH$, $C_7F_{15}COOH$ and the like and salts thereof.

The fluorine-containing anionic surfactants may also include the carboxylic surfactants represented by the general formula (ii):

$$X^1(CF_2)_p-O-CX^2X^3-(CF_2)_q-O-CX^4X^5- \\ (CF_2)_r-COOM^1 \qquad (ii)$$

wherein $X^1$, $X^2$, $X^3$, $X^4$ and $X^5$ are the same or different from each other and represent H, F or $CF_3$; $M^1$ is a monovalent alkali metal, $NH_4$ or H; p is 1 or 2; q is 1 or 2; and r is 0 or 1. The fluoroether carboxylic acids represented by the general formula (ii) may include $CF_3OCF(CF_3)CF_2OCF(CF_3)COONH_4$, $CF_3CF_2OCF_2CF_2OCF_2COONH_4$, $CF_3OCF_2CF_2CF_2OCHFCF_2COONH_4$ and the like.

The fluorine-containing anionic surfactants may also be the carboxylic surfactants represented by the general formula (iii):

$$X-(CF_2)_m-O-(CF(CF_3)CF_2O)_n-CF(CF_3) \\ COOM^1 \qquad (iii)$$

wherein X is H, F or Cl; m is an integer of 1 to 10, e.g. 5; n is an integer of 0 to 5, e.g. 1; and $M^1$ is a monovalent alkali metal, $NH_4$ or H.

Examples of the carboxylic surfactants represented by the general formula (iii) include $CF_3-O-CF(CF_3)CF_2O-CF(CF_3)COOH$ and the like and salts thereof.

The fluorine-containing anionic surfactants may also be the carboxylic surfactants represented by the general formula (Iv):

$$X-(CF_2)_m-O-(CF(CF_3)CF_2O)_n- \\ CHFCF_2COOM^1 \qquad (iv)$$

wherein X, m, n and M¹ are as defined above.

The fluorine-containing anionic surfactants may also be the carboxylic surfactants represented by the general formula (v):

$$X—(CF_2)_m—O—(CF(CF_3)CF_2O)_n—CH_2CF_2COOM^1 \quad (v)$$

wherein X, m, n and M¹ are as defined above.

The fluorine-containing anionic surfactants may also include the carboxylic surfactants represented by the general formula (vi):

$$Rf^3OCF_2CF_2O(CF_2)_pCOOM^1 \quad (vi)$$

wherein $Rf^3$ is a partially-fluorinated or perfluorinated alkyl group; M¹ is a monovalent alkali metal, $NH_4$ or H; and p is 1 or 2. $Rf^3$ is preferably an alkyl group having 1 to 3 carbon atoms. The carboxylic surfactants represented by the general formula (vi) may include $CF_3CF_2OCF_2CF_2OCF_2COONH_4$, $CF_3CF_2OCF_2CF_2OCF_2COOH$ and the like.

The fluorine-containing anionic surfactants may also include the fluoroether carboxylic acids represented by the general formula (vii):

$$Rf^4OCHFCF_2COOM^1 \quad (vii)$$

wherein $Rf^4$ is a linear aliphatic group or a linear aliphatic group to which one or more oxygen atoms are introduced, both aliphatic groups being partially-fluorinated or perfluorinated; and M¹ is a monovalent alkali metal, $NH_4$ or H. $Rf^4$ is preferably an aliphatic group having 1 to 3 carbon atoms. The carboxylic surfactants represented by the general formula (vii) may include $CF_3OCF_2CF_2CF_2OCHFCF_2COONH_4$, $CF_3OCF_2CF_2CF_2OCHFCF_2COOH$ and the like.

Thus, the fluorine-containing surfactant is preferably at least one fluorine-containing surfactant selected from the group consisting of: the carboxylic surfactants represented by the general formula (i):

$$X—Rf^1COOM^1 \quad (i)$$

wherein X is H, F or Cl; $Rf^1$ is a linear or branched fluoroalkylene group having 4 to 14, preferably 5 to 7 carbon atoms; and M¹ is a monovalent alkali metal, $NH_4$ or H;
the carboxylic surfactants represented by the general formula (ii):

$$X'(CF_2)_p—O—CX^2X^3—(CF_2)_w—O—CX^4X^5—(CF_2)_r—COOM^1 \quad (ii)$$

wherein X', $X^2$, $X^3$, $X^4$ and $X^5$ are the same or different from each other and represent H, F or $CF_3$; M¹ is a monovalent alkali metal, $NH_4$ or H; p is 1 or 2; q is 1 or 2; and r is 0 or 1;
the carboxylic surfactants represented by the general formula (iii):

$$X—(CF_2)_m—O—(CF(CF_3)CF_2O)_n—CF(CF_3)COOM^1 \quad (iii)$$

wherein X is H, F or Cl; m is an integer of 1 to 10; n is an integer of 0 to 5; and M¹ is a monovalent alkali metal, $NH_4$ or H;
the carboxylic surfactants represented by the general formula (Iv):

$$X—(CF_2)_m—O—(CF(CF_3)CF_2O)_n—CHFCF_2COOM^1 \quad (iv)$$

wherein X, m, n and M¹ are as defined above;
the carboxylic surfactants represented by the general formula (v):

$$X—(CF_2)_m—O—(CF(CF_3)CF_2O)_n—CH_2CF_2COOM^1 \quad (v)$$

wherein X, m, n and M¹ are as defined above;
the carboxylic surfactants represented by the general formula (vi):

$$Rf^3OCF_2CF_2O(CF_2)_pCOOM^1 \quad (vi)$$

wherein $Rf^3$ is a partially-fluorinated or perfluorinated alkyl group; M¹ is a monovalent alkali metal, $NH_4$ or H; and p is 1 or 2; and
the carboxylic surfactants represented by the general formula (vii):

$$Rf^4OCHFCF_2COOM^1 \quad (vii)$$

wherein $Rf^4$ is a linear aliphatic group or a linear aliphatic group to which one or more oxygen atoms are introduced, both aliphatic group being partially-fluorinated or perfluorinated; and M¹ is a monovalent alkali metal, $NH_4$ or H.

The nonionic surfactants which may be used as the surfactant (A) are not specifically limited so long as they are nonionic surfactants devoid of fluorine atoms. They may include ether-based nonionic surfactants such as polyoxyethylene alkylphenyl ethers, polyoxyethylene alkyl ethers, polyoxyethylene alkylene alkyl ethers; polyoxyethylene derivatives such as ethylene oxide/propylene oxide block copolymers; ester-based nonionic surfactants such as sorbitan fatty acid esters, polyoxyethylene sorbitan fatty acid esters, polyoxyethylene sorbitol fatty acid esters, fatty acid esters of glycerol, polyoxyethylene fatty acid esters; and amine-based nonionic emulsifiers such as polyoxyethylene alkylamines, alkyl alkanolamides and the like. From the environmental point of view, nonionic surfactants which do not contain alkyl phenol in their structures are preferably used.

The concentration of the surfactant (A) in the aqueous dispersion is preferably from 0.001 to 10% by mass, more preferably from 0.005 to 1% by mass relative to the PTFE.

The aqueous dispersion in the step (1) can be prepared by aqueous dispersion polymerization, or by further treating the aqueous dispersion obtained by aqueous dispersion polymerization (emulsion polymerization) with techniques such as ion-exchange treatment, cloud point concentration, electroconcentration, ultrafiltration.

The aqueous dispersion polymerization can be carried out by applying well-known polymerization techniques which may be carried out with batch, semi-batch or continuous manners. The above fluorine-containing anionic surfactant, the modifying monomer, a polymerization initiator, a stabilizer, a chain transfer agent and the like can be continuously or sequentially added during polymerization reaction of aqueous dispersion polymerization depending on the desired molecular weight and properties of a target PTFE. The aqueous dispersion polymerization is generally carried out for 0.5 to 50 hours.

The aqueous dispersion polymerization is carried out by using a polymerization initiator with agitation in an aqueous medium and in the presence of the fluorine-containing anionic surfactant in a pressure resistant reactor equipped with an agitator. The aqueous dispersion polymerization can be initiated by charging an aqueous medium, a chain transfer agent, a monomer and an optional stabilizer and adjusting temperature and pressure prior to addition of the polymerization initiator.

The aqueous dispersion polymerization can be carried out while feeding a monomer into the aqueous medium. In the aqueous dispersion polymerization, only tetrafluoroethylene (TFE) may be fed as the monomer, or both TFE and the modifying monomer described above polymerizable with TFE may be fed.

The aqueous medium is preferably deionized, highly-purified water.

The fluorine-containing anionic surfactant can be fed to the polymerization reaction system by various ways. For example, the entire amount thereof may be fed to the reaction system at one time before the reaction is started, or it can be fed gradually in order to control particle size as described in Japanese Examined Patent Publication No. S44-14466. In order to improve the stability of the aqueous dispersion during polymerization, it is preferably added during polymerization sequentially or continuously.

The fluorine-containing anionic surfactant can be generally used, although it may depend on the type of the fluorine-containing anionic surfactant used and the desired primary particle size, in an amount selected from the range from 0.02 to 0.50% by mass relative to the aqueous medium used in the reaction.

For the purpose of stabilization of the dispersion in the reaction system, a stabilizer may optionally be added.

The stabilizer is preferably paraffin wax, fluorine-containing oil, fluorine-containing compounds, silicone oil and the like which are substantially inert in the reaction, among which paraffin wax is preferred.

The paraffin wax is preferably hydrocarbons having 12 or more carbon atoms and being liquid under reaction conditions, among which hydrocarbons having 16 or more carbon atoms are more preferred. The melting point thereof is preferably from 40 to 65° C., more preferably from 50 to 65° C.

The paraffin wax is preferably used in an amount corresponding to from 1 to 12% by mass, more preferably from 2 to 8% by mass of the aqueous medium.

In order to adjust pH of reaction, a buffering agent such as ammonium carbonate, ammonium phosphate may be added.

The polymerization initiator for the emulsion polymerization may be the one conventionally used in polymerization of TFE.

The polymerization initiator for the emulsion polymerization is preferably radical polymerization initiators, redox-type polymerization initiators and the like.

Although the amount of the polymerization initiator is preferably low because SSG of the resulting PTFE can be decreased, an extremely low amount tends to cause reduced polymerization rate and an extremely high amount tends to cause an increased SSG of the resulting PTFE.

The radical polymerization initiator may include water-soluble peroxides and the like, among which persulfates such as ammonium persulfate, potassium persulfate; permanganates such as potassium permanganate; and water-soluble organic peroxides such as disuccinic acid peroxide are preferred with ammonium persulfate being more preferred. One or two or more in combination of these compounds may be used.

The amount of the radical polymerization initiator may be appropriately selected according to the polymerization temperature and a target SSG, and preferably corresponds to an amount from 1 to 100 ppm, more preferably from 1 to 20 ppm of the mass of the aqueous medium generally used.

When the radical polymerization initiator is used as the polymerization initiator, PTFE having a low SSG can be obtained by adding a radical scavenger during polymerization reaction.

The radical scavenger may include unsubstituted phenols, polyhydric phenols, aromatic hydroxy compounds, aromatic amines, quinone compounds and the like, among which hydroquinone is preferred.

The radical scavenger is preferably added before the polymerization of 50% by mass, more preferably 30% by mass of the whole amount of TFE to be consumed during the polymerization reaction is completed, in order to obtain PTFE having a low SSG.

The amount of the radical scavenger preferably corresponds to 0.1 to 10 ppm of the aqueous medium generally used.

The redox-type polymerization initiator includes a combination of a water-soluble oxidizing agent such as permanganates, e.g. potassium permanganate, persulfates, bromates and a reducing agent such as sulfites, bisulfites, oxalic acid, iron (II) chloride, diimine. Among them, the combination of potassium permanganate and oxalic acid is preferred.

When the redox-type polymerization initiator is used as the polymerization initiator, PTFE having a low SSG and high breaking strength can be obtained.

The amount of the redox polymerization initiator can be appropriately selected according to the polymerization temperature and a target SSG, and preferably corresponds to 1 to 100 ppm of the mass of the aqueous medium generally used.

Regarding the redox-type polymerization initiator, in order to obtain PTFE having a low SSG, addition of either of the oxidizing agent and reducing agent, preferably the oxidizing agent, is preferably halted during polymerization reaction. The addition is preferably halted before the polymerization of 50% by mass, more preferably 30% by mass of the whole amount of TFE to be consumed during the polymerization reaction is completed.

The aqueous dispersion polymerization is preferably carried out in the presence of dicarboxylic acid in an amount of 30 to 200 ppm relative to the aqueous medium, in order to reduce the amount of a coagulation formed during polymerization reaction. The dicarboxylic acid may be added prior to the initiation of polymerization reaction or during polymerization reaction.

The dicarboxylic acid is preferably the one represented by the general formula: HOOCRCOOH, wherein R is an alkylene group having 1 to 5 carbon atoms. Among them, succinic acid, malonic acid, glutaric acid, adipic acid and pimelic acid are more preferred with succinic acid being further preferred.

The modifying monomers may be used in order to adjust molding properties, extruding pressure and transparency and mechanical strength of molded articles.

A chain transfer agent may also be added in order to adjust molecular weight and extrusion pressure. The chain transfer agent may include hydrogen; hydrocarbons such as methane, ethane, propane; halogenated hydrocarbons such as $CH_2CF_2$, $CH_3Cl$, $CH_2Cl_2$, $C_2H_3Cl_2F$; water-soluble organic compounds such as methanol, ethanol. It may be added at the beginning of polymerization or during polymerization depending on the purposes of addition thereof. It may be added at one time, sequentially or continuously.

The polymerization conditions such as temperature or pressure at polymerization in the aqueous dispersion polymerization is not specifically limited and can be appropriately selected according to the amount of TFE used, the type and amount of the modifying monomer (s), the type and amount of the polymerization initiator(s), productivity or the like. The temperature at polymerization is preferably from 5 to 100° C., more preferably from 50 to 90° C. The pressure at polymerization is preferably from 0.1 to 3.9 MPa.

The polymerization reaction can be stopped by terminating the agitation when the concentration of the polymer latex produced reaches 20 to 45% by mass and discharging the monomer(s) from the system.

The process of the present invention comprises the step (2) of initiating coagulation of the polytetrafluoroethylene in the aqueous dispersion by agitating the aqueous dispersion prepared in the step (1). A person skilled in the art can appropriately select a rotational speed of the agitation based on the size of containers, the shape of impellers and structure of baffle plates. It is well-known to a person skilled in the art that the agitation in the step (2) is generally needed to be more vigorous than the agitation in the aqueous dispersion polymerization. In general, when a strong shear force is applied to aqueous dispersions, primary PTFE particles are aggregated to form wet powder in water via a state of slurry. The wet powder then becomes water repellent and is separated from water.

By applying a strong shear force to the PTFE aqueous dispersion obtained from emulsion polymerization of TFE (in which primary particles are dispersed in an aqueous medium), the primary particles are destabilized to aggregate, and simultaneously entrain the air, so that they are separated from water to give the PTFE fine powder (see Fluororesin Handbook ("Fusso Jushi Handbook"), ed. Takaomi Satokawa). The aggregate of the primary particles (fine powder) collected from the aqueous dispersion, i.e. the PTFE fine powder obtained by coagulation, has large specific surface area as well as fibrillating properties. On the other hand, powder obtained by granulating powder obtained by suspension polymerization of TFE has small specific surface area and has poor fibrillating properties. Thus, the step of agitating the aqueous dispersion of PTFE primary particles to effect coagulation is substantially different from the step of granulating PTFE powder obtained by suspension polymerization both in terms of the objects to be agitated (materials) and of the products.

The aqueous dispersion prepared in the step (1) may be diluted with water to the polymer concentration of 10 to 20% by mass.

When the aqueous dispersion is prepared by aqueous dispersion polymerization in the step (1), the steps (1) and (2) may be continuously performed.

The step (2) is also preferably the one in which coagulation is initiated by starting agitation after or at the same time of addition of a coagulant. The coagulant is preferably at least one selected from the group consisting of inorganic acids, inorganic salts and water-soluble organic compounds. The inorganic acids may include hydrochloric acid, sulfuric acid, nitric acid, oxalic acid and the like. The inorganic salts may include potassium nitrate, sodium nitrate, ammonium carbonate, sodium carbonate, aluminium nitrate, aluminium sulfate, magnesium nitrate, magnesium sulfate, ammonium hydrogen carbonate, sodium hydrogen carbonate and the like. The water-soluble organic compounds may include methanol, acetone, ethanol and the like.

In the step (2), pH may optionally be adjusted. In the step (2), the temperature and specific gravity of the aqueous dispersion are preferably adjusted to from 0 to 80° C. and from 1.03 to 1.20, respectively. Before or during coagulation, a pigment for colouring and a filler for imparting conductivity and improved mechanical properties can also be added.

Further, the step (2) is preferably the step (2) of initiating coagulation of the polytetrafluoroethylene in the aqueous dispersion prepared in the step (1) by agitating the aqueous dispersion with a discharge flow-type impeller. The rotational speed of the agitation is not specifically limited, but can be generally from 50 to 1000 rpm.

The discharge flow-type impeller can create an axial flow and allows an easy entrainment of the fine powder in water, which has been rendered to be water repellent by coagulation, allowing the fine powder which is resistant to disruption being obtained. It also allows easy rolling at container walls by the agitation. Thus, by using such impeller, the resulting fine powder is less compressed, so that the aggregate thereof may easily be disintegrated, and the powder having narrow shape distribution may be obtained.

The discharge flow-type impeller may include the impeller having a flow-inducing part by means of rotation of a shaft in a cylinder or a cone (a shape of a truncated cone). The flow-inducing part by means of agitation may be a conventional impeller of paddle-, anchor-, ribbon- and propeller-types and the like, or a flat plate directly connected to the cylinder or cone. By rotating the flow-inducing part or the cylinder or cone to which the flat plate is directly connected, an axial flow can be created due to the presence of the cylinder or cone, so that the agitation can be carried out.

The discharge flow-type impeller may also include the conventional impeller as exemplified above on the periphery of which a guide plate or a guide cylinder is inserted. The shape and number of the guide plate are not specifically limited. The guide cylinder preferably has a shape of cylinder or truncated cone (cone). By rotating such impeller, an axial flow can be created due to the presence of the guide plate or guide cylinder, so that the agitation can be carried out.

Figure 4:
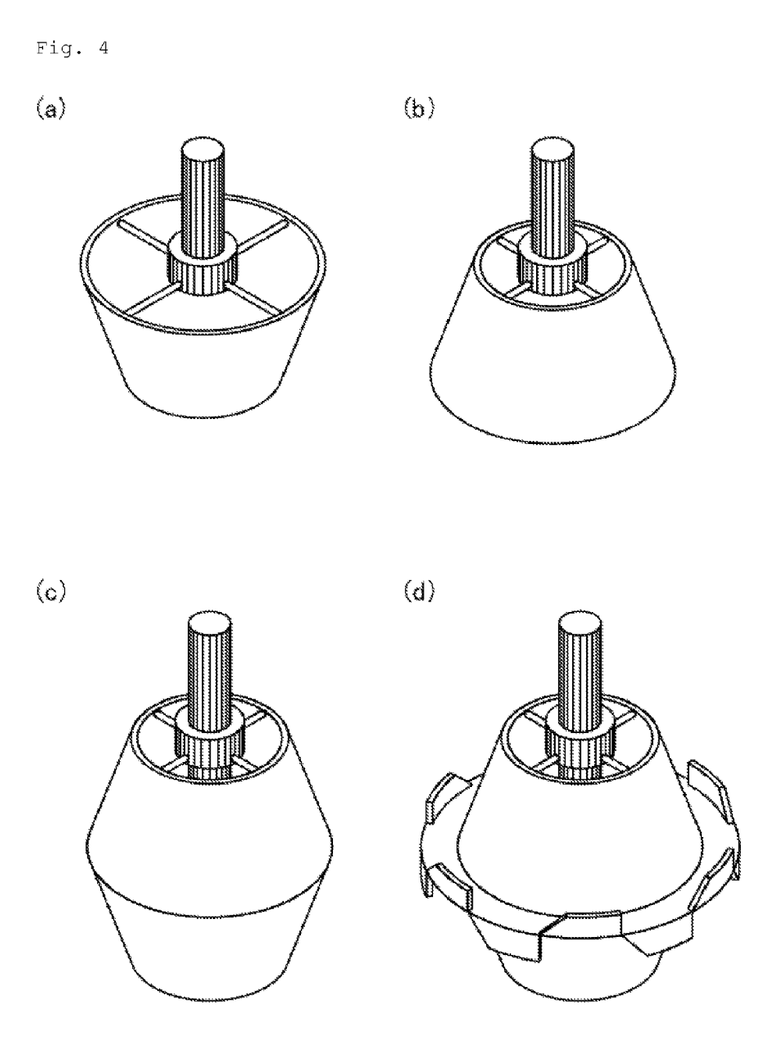

Among these, the discharge flow-type impeller is preferably the cone-shaped impellers as shown in FIG. 4.

The cone-shaped impellers include an upward cone-shaped impeller, a downward cone-shaped impeller, a frontal coupling cone-shaped impeller, a double cone-shaped impeller having a disc saw and the like.

FIG. 4 is a schematic view of examples of cone-shaped impellers, in which FIG. 4(a) is an upward cone-shaped impeller, FIG. 4(b) is a downward cone-shaped impeller, FIG. 4(c) is a frontal coupling cone-shaped impeller, and FIG. 4(d) is a double cone-shaped impeller having a disc saw.

Among cone-shaped impellers, downward type is more preferred.

When the discharge flow-type impeller is used for the agitation in the step (2), the discharge flow-type impeller is generally used until the end of coagulation in the step (4).

The process of the present invention comprises the step (3) of adding a surfactant (B) after the step (2).

The surfactant(B) may include fluorine-containing surfactants such as fluorine-containing anionic surfactants, fluorine-containing nonionic surfactants, fluorine-containing cationic surfactants, fluorine-containing betaine surfactants; and hydrocarbon-based surfactants such as hydrocarbon-based nonionic surfactants, hydrocarbon-based anionic surfactants.

The fluorine-containing anionic surfactants may include the compounds represented by the general formula (1). Specific examples may include $CF_3(CF_2)_6COONH_4$, $CF_3(CF_2)_7COONa$, $H(CF_2CF_2)_4COONH_4$ and the like.

(1)

wherein $R^1$ is F or $CF_3$; $R^2$ is H, F or $CF_3$, n is an integer of 4 to 20; m is 0 or an integer of 1 to 6; and $R^3$ is COOM or $SO_3M$, wherein M is H, $NH_4$, Na, K or Li.

The fluorine-containing nonionic surfactants may include the compounds represented by the general formula (2).

(2)

wherein $R^1$, $R^2$, n and m are as defined above; k is 0 or 1; $R^4$ is H, $CH_3$ or $OCOCH_3$; and $R^5$ is $(OCH_2CH_2)_pOR^6$, wherein p is 0 or an integer of 1 to 50; and $R^6$ is H, an alkyl group having 1 to 20 carbon atoms or an aromatic group having 6 to 26 carbon atoms.

The fluorine-containing cationic surfactants may include the compounds represented by the above general formula (2), wherein $R^5$ is the group represented by the formula (3).

(3)

The fluorine-containing betaine surfactants may include the compounds represented by the above general formula (2), wherein $R^5$ is the group represented by the formula (4).

(4)

The hydrocarbon-based nonionic surfactants may include polyoxyethylene alkyl ethers, polyoxyethylene alkyl esters, polyoxyethylene alkylphenyl ethers, sorbitan alkylates, polyoxyethylene sorbitan monoalkylates and the like.

The hydrocarbon-based anionic surfactants may include alkyl carboxylates, alkyl sulfonates, alkyl sulfates, alkyl benzene sulfonates, alkyl phosphonates, alkyl phosphates, and the like.

The surfactant (B) is preferably a nonionic surfactant and more preferably a hydrocarbon-based nonionic surfactant because it can contributes to effects with a small amount.

Hydrocarbon-based nonionic surfactants exhibit greater effects in improving the properties of the obtained PTFE fine powder in comparison to fluorine-containing anionic surfactants at the same concentration. Among the fluorine-containing anionic surfactants, those having higher interfacial activity exhibit greater effects in improving the properties of the obtained PTFE fine powder, compared at the same concentration.

The amount of the surfactant (B) used is preferably 1 ppm to 10% by mass relative to the polymer solid matter in the PTFE aqueous dispersion. When the amount of the surfactant (B) is too small, the PTFE fine powder having superior handling characteristics may not be obtained, and when the amount of the surfactant (B) is too high, the surfactant (B) tends to remain in the fine powder to stain the same. The lower limit of the amount of the surfactant (B) used is more preferably 50 ppm and the upper limit is more preferably 10000 ppm.

In the step (3), the surfactant (B) is preferably added after the primary particles of the PTFE are aggregated to form a slurry. The entrainment of the surfactant in the fine powder may lead to reduced effects of addition of the surfactant and coloration of the fine powder and molded articles. However, when the surfactant (B) is added at this time, the surfactant in a small amount can deliver desired effects of the present invention. Due to the same reason, the surfactant (B) is more preferably added after the wet powder of the PTFE is formed. It is preferably added immediately before or after the wet powder becomes water repellent and is separated from water. It is more preferable that it is added immediately before the wet powder becomes water repellent and is separated from water.

The present process comprises the step (4) of terminating coagulation after the step (3). Coagulation can be terminated by halting the agitation. Coagulation is preferably terminated after confirming that slurry is not remained and the water layer is transparent enough to see through. Coagulation is preferably terminated after the agitation is continued for 30 seconds or more, preferably 1 minutes or more, more preferably 3 min or more after water is separated (after water is repelled).

It is also possible to find when the surfactant is to be added and when coagulation is to be terminated by monitoring change in torque or change in sound during coagulation.

The process of the present invention comprises the step (5) of collecting a wet powder of the PTFE. The wet powder of the polytetrafluoroethylene can be collected by filtering off the wet powder of the PTFE from the mixture of the PTFE coagulation particles obtained in the step (4), water and the surfactant (B).

The process may comprise the step of washing the wet powder of the PTFE obtained in the step (4). The washing can be carried out by adding water and the surfactant (B) to the wet powder, keeping agitation until the PTFE particles repel water and collecting the wet powder of the PTFE. The handling characteristics of the PTFE fine powder can be further improved when the above agitation is carried out at 30 to 90° C. The temperature for the above agitation is more preferably 30 to 60° C.

The process of the present invention comprises the step (6) of drying the wet powder of the PTFE.

The drying is preferably carried out with little flow of the wet powder of the PTFE and by heating means such as hot air, which can be combined with reduced pressure or vacuum. The temperature for drying may be below the melting point of the polymer and is usually suitable in the range of 100 to 300° C. The drying temperature is preferably 180° C. or more and below 300° C.

The drying conditions may affect paste extrusion performances. The paste extrusion pressure tends to be increased with increased dying temperature. The friction among powder, especially at high temperature, is liable to cause adverse effects on the properties of fine powder because fine powder is easily fibrillated with a small shear force and loses original particle structures to result in decreased paste extrusion performances.

The process of the present invention makes it possible to produce PTFE fine powders having the following properties:

(1) A fine powder consisting of a TFE homopolymer and having SSG: 2.160 to 2.230; average particle size: 300 to 800 µm; apparent density: 0.40 to 0.52 g/ml; compression ratio: 1.20 or less; and aggregate disintegration degree with 50-sec vibration: 60% or more. The compression ratio of the PTFE fine powder is preferably 1.15 or less. The aggregate disintegration degree with 50-sec vibration is preferably 70% or more.

(2) A fine powder consisting of a TFE homopolymer and having SSG: 2.130 to 2.160, average particle size: 300 to 800

μm; apparent density: 0.40 to 0.52 g/ml; compression ratio: 1.20 or less; and aggregate disintegration degree with 50-sec vibration: 40% or more. The compression ratio of the PTFE fine powder is preferably 1.15 or less, more preferably 1.10 or less.

(3) A fine powder consisting of a modified PTFE and having SSG: 2.140 to 2.230; extrusion pressure at RR (Reduction Ratio) 1500/ISOPAR G 20.5 parts by mass: 80 MPa or less; average particle size: 300 to 800 μm; apparent density: 0.40 to 0.52 g/ml; compression ratio: 1.20 or less; and aggregate disintegration degree with 50-sec vibration: 70% or more. The extrusion pressure of the PTFE fine powder is preferably 70 MPa or less. The compression ratio is preferably 1.15 or less. The aggregate disintegration degree with 50-sec vibration is preferably 80% or more.

(4) A fine powder consisting of a modified PTFE and having SSG: 2.140 to 2.230; extrusion pressure at RR (Reduction Ratio) 1500/ISOPAR G 20.5 parts by mass: 60 MPa or less; average particle size: 300 to 800 μm; apparent density: 0.40 to 0.52 g/ml; compression ratio: 1.20 or less; and aggregate disintegration degree with 50-sec vibration: 70% or more. The compression ratio of the PTFE fine powder is preferably 1.15 or less. The aggregate disintegration degree with 50-sec vibration is preferably 90% or more.

The PTFE fine powders (1) to (4) obtained according to the present process preferably have an average particle size of 300 to 800 μm, more preferably 400 to 700 μm.

The PTFE fine powders (1) to (4) obtained according to the present process preferably have apparent density of 0.40 to 0.52 g/ml, more preferably 0.45 to 0.52 g/ml.

The standard specific gravity (SSG) is measured in conformity with ASTM D 4895-89.

The apparent density is measured in conformity with JIS K6892.

The average particle size is measured in conformity with JIS K6891.

The compression ratio is measured at 25° C. in accordance with the procedures (1) to (6) shown below:

(1) A round-shaped powder paper (diameter: 50 mm) is placed at the bottom of a SUS cylindrical cup (inner diameter: 50 mm (measured value: 51.7 mm), volume: 150 ml). The inner side surface of the cup is also covered with a powder paper.

(2) PTFE fine powder is sieved with a 10-mesh sieve, and 50 g of the material passing through the sieve is weighed and placed in the cylindrical cup.

(3) The surface of the PTFE fine powder in the cylindrical cup is smoothened and covered with a round-shaped powder paper (diameter: 50 mm).

(4) A weight (a cylinder having a diameter of 50 mm, weight: 330 g) is placed on the powder paper on the surface, and is tapped for 20 times on Powder Tester (Hosokawa Micron Corporation) (tapping stroke: 20 mm).

(5) After tapping, a cylindrical cake of the PTFE fine powder is taken out from the cylindrical cup and the height thereof is measured with callipers.

(6) The apparent density of the cake is calculated from the cross-section area and height of the cake and the compression ratio is calculated from the following equation (A):

(Compression ratio)=(Apparent density of cake)/(Apparent density of PTFE fine powder)     (A), wherein the apparent density of the PTFE fine powder is measured in conformity with JIS K6892, as described above.

The aggregate disintegration degree with 50-sec vibration is measured at 25° C. according to the following procedures (1) to (7):

(1) A round-shaped powder paper (diameter: 50 mm) is placed at the bottom of a SUS cylindrical cup (inner diameter: 50 mm (measured value: 51.7 mm), volume: 150 ml). The inner side surface of the cup is also covered with a powder paper.

(2) PTFE fine powder is sieved with a 10-mesh sieve, and 50 g of the material passing through the sieve is weighed and placed in the cylindrical cup.

(3) The surface of the PTFE fine powder in the cylindrical cup is smoothened and covered with a round-shaped powder paper (diameter: 50 mm).

(4) A weight (a cylinder having a diameter of 50 mm, weight: 330 g) is placed on the powder paper on the surface, and is tapped for 20 times in Powder Tester (Hosokawa Micron Corporation) (tapping stroke: 20 mm).

(5) After tapping, a cylindrical cake of the PTFE fine powder is taken out from the cylindrical cup.

(6) The cylindrical cake taken out is placed on a 8-mesh sieve and subjected to vibration for 50 seconds on Powder Tester (Hosokawa Micron Corporation) (vibration scale: 4.5).

(7) The mass of the PTFE fine powder dropped by vibration is weighed and the aggregate disintegration degree is calculated from the following equation (B):

(Aggregate disintegration degree)=(Mass of PTFE fine powder passed through the sieve during 50 seconds)/(Total mass of PTFE fine powder)× 100(% by mass)     (B)

The extrusion pressure is measured according to the following procedures:

PTFE fine powder (100 g) and 20.5 g of an extrusion aid, hydrocarbon oil (trade name: ISOPARG, Exxon Chemical K.K.) were mixed in a glass bottle and aged at room temperature (25±2° C.) for 1 hour. The mixture was charged in an extrusion die (drawing angle: 30°; equipped with an orifice (diameter: 0.65 mm, length: 2 mm) on its lower end; RR is 1500) equipped with a cylinder (inner diameter: 25.4 mm). A load of 1.2 MPa was applied to a piston in the cylinder and maintained for 1 min, immediately followed by extrusion of the mixture from the orifice at room temperature with a ram speed of 20 mm/min to obtain a rod-shaped material. The extrusion pressure is defined as a pressure at an equilibrium state during a latter half of the extrusion divided by a cross-section area of the cylinder.

EXAMPLES

The present invention is now illustrated in further detail in reference to the following examples. However, the present invention is not limited merely to these examples.

The data shown in the examples were obtained according to the following measurement methods.

1. Average Particle Size of Secondary Particles (Fine powder)

It was measured in conformity with JIS K6891.

2. Apparent Density

It was measured in conformity with JIS K6892.

3. Standard Specific Gravity (Ssg)

It was measured in conformity with ASTM D 4895-89.

4. Compression Ratio

Figure 1:
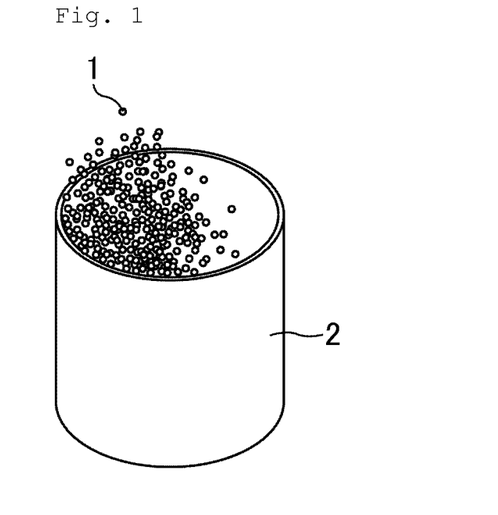
FIG. 1 shows a method for measuring the compression ratio and aggregate disintegration degree.
Figure 2:
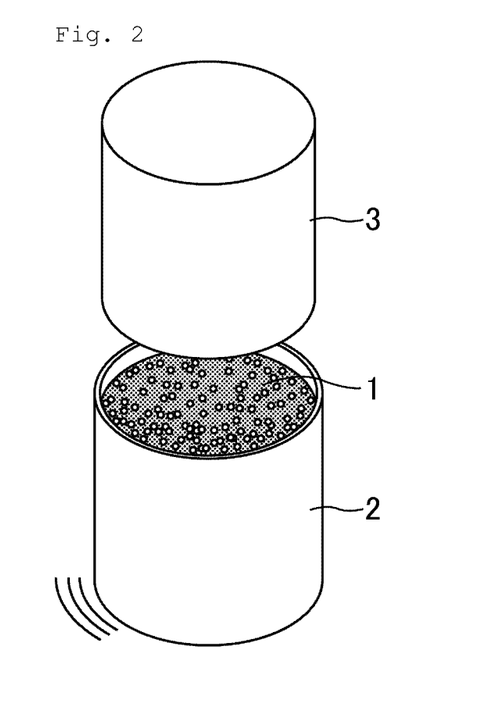
FIG. 2 shows a method for measuring the compression ratio and aggregate disintegration degree.
Figure 3:
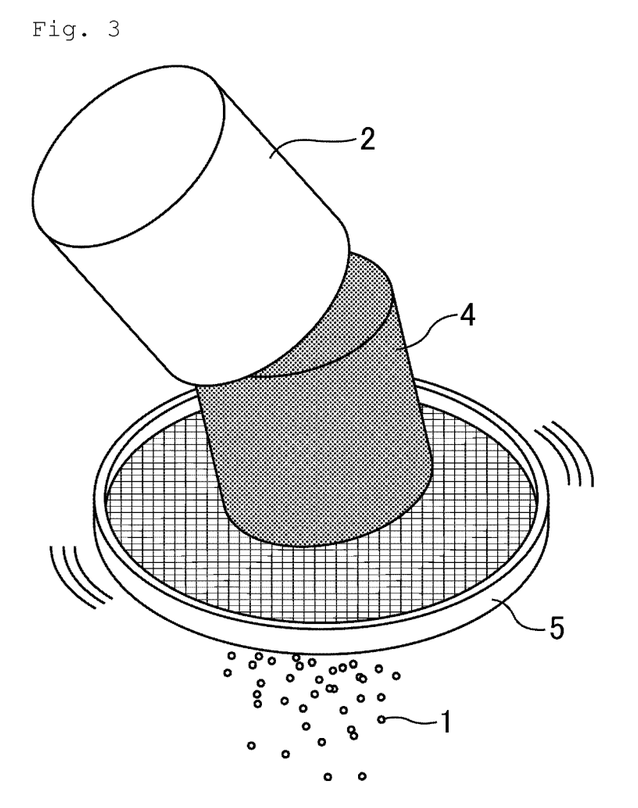
FIG. 3 shows a method for measuring the compression ratio and aggregate disintegration degree.

The compression ratio was measured on Powder Tester (Hosokawa Micron Corporation) at 25° C. FIGS. 1 to 3 give an overview of the measurement of the compression ratio. A round-shaped powder paper (diameter: 50 mm) was placed at the bottom of a SUS cylindrical cup 2 (inner diameter: 50 mm (measured value: 51.7 mm), volume: 150 ml). The inner side surface of the cup was also covered with a powder paper. The PTFE fine powder 1 was sieved with a 10-mesh sieve, and 50 g of the material passing through the sieve was weighed and placed in the cylindrical cup 2 as shown in FIG. 1. The surface of the powder was smoothened and covered with a round-shaped powder paper (diameter: 50 mm). As shown in FIG. 2, a weight 3 (a cylinder having a diameter of 50 mm, weight: 330 g) was placed on the powder paper, and was tapped for 20 times on Powder Tester (tapping stroke: 20 mm). After tapping, a cylindrical cake 4 of the PTFE fine powder was taken out from the cylindrical cup 2 and the height thereof was measured with callipers, as shown in FIG. 3. The apparent density was calculated from the cross-section area and height of the cake. The compression ratio was calculated from the following equation:

(Compression ratio)=(Apparent density of cake)/(Apparent density of fine powder)

The compression ratio is preferred to be as close as 1, which indicates that fine powder is less cohesive and has superior handling characteristics.

5. Aggregate Disintegration Degree

The aggregate disintegration degree was measured at 25° C. The vibration strength was preliminarily adjusted so that the vibration scale of 5.5 corresponds to the amplitude of 1 mm. As shown in FIG. 3, the cylindrical cake 4 was placed on a 8-mesh sieve 5 and subjected to vibration on Powder Tester (Hosokawa Micron Corporation) (vibration scale: 4.5). The mass of the PTFE fine powder 1 dropped due to vibration was measured every 5 seconds and the aggregate disintegration degree was calculated from the following equation:

(Aggregate disintegration degree)=(Mass of PTFE fine powder passed through the sieve due to vibration)/(Total mass of PTFE fine powder)× 100(% by mass).

The aggregate disintegration degree is preferred to be high, which indicated that powder is looser in binding and better in handling characteristics.

6. Paste Extrusion Pressure

PTFE fine powder (50 g) and 10.25 g of an extrusion aid, hydrocarbon oil (trade name: ISOPARG, Exxon Chemical K.K.) were mixed in a glass bottle and aged at room temperature (25±2° C.) for 1 hour. The mixture was charged in an extrusion die (drawing angle: 30°; equipped with an orifice (diameter: 0.65 mm, length: 2 mm) on its lower end; RR is 1500) equipped with a cylinder (inner diameter: 25.4 mm). A load of 1.2 MPa was applied to a piston in the cylinder and maintained for 1 min, immediately followed by extrusion of the mixture from the orifice at room temperature with a ram speed of 20 mm/min to obtain a rod-shaped material. The extrusion pressure is defined as a pressure at an equilibrium state during a latter half of the extrusion divided by a cross-section area of the cylinder.

Polymerization Example 1

To a 6-L stainless steel (SUS316) autoclave equipped with a stainless steel (SUS316) anchor-type impeller and a thermostat jacket were added 3460 g deionized water, 100 g paraffin wax and 5.25 g ammonium perfluorooctanoate, and the autoclave was heated to 85° C. while removing oxygen from the system by replacing three times with nitrogen gas and twice with TFE gas. The inner pressure was then brought to 0.70 MPa with TFE gas and agitation at 250 rpm and inner temperature of 85° C. were maintained.

After the temperature in the polymerization vessel was stabilized, an aqueous solution of 15 mg ammonium persulfate in 20 g deionized water and an aqueous solution of 260 mg disuccinic acid peroxide in 20 g deionized water were pressed therein with TFE and the inner pressure of the autoclave was brought to 0.80 MPa. Reaction proceeded at an elevated rate, while the reaction temperature and agitation were maintained at 85° C. and 250 rpm, respectively. The inner pressure of the autoclave was always kept at 0.80 MPa with the continuous feed of TFE.

When 1130 g of TFE was consumed, agitation and feeding of TFE were stopped, and gas in the autoclave was immediately exhausted to ordinary pressure to terminate the reaction.

The resulting PTFE aqueous dispersion had a solids content of 24.3% by mass, average primary particle size of 0.32 and a standard specific gravity (SSG) of 2.177.

Example 1

The PTFE aqueous dispersion obtained in polymerization example 1 was added with deionized water to adjust the specific gravity to 1.080 g/ml (25° C.). To a 17-L stainless steel coagulation vessel equipped with an anchor-type impeller and a baffle plate was added 8.0 L of the PTFE aqueous dispersion whose specific gravity had been adjusted, and the temperature of the liquid was controlled to 22° C. Immediately after the adjustment of temperature, 6 ml nitric acid (60%) was added and, at the same time, agitation at 400 rpm was initiated. After initiation of agitation, the aqueous dispersion underwent a state of slurry and wet powder was formed. A 1% solution of a nonionic surfactant K204 (NOF Corporation) (57 g) was added to the coagulation vessel immediately before the wet powder was separated from water, and agitation was continued for 1 min.

The polymer powder in wet state was then filtered off and was charged into the coagulation vessel with 7.0 L deionized water. The temperature was adjusted to 25° C. and the polymer powder was washed twice with an agitation speed of 400 rpm. After washing, the polymer powder in wet state was filtered off, and left in a hot air circulation dryer at 155° C. for 18 hours to give PTFE fine powder.

Average particle size, an apparent density, a compression ratio and an aggregate disintegration degree of the resulting PTFE fine powder were determined. The results are shown in Table 1.

Examples 2 to 7

PTFE fine powders were obtained in the same manner as Example 1 except that the surfactant and its amount were changed as shown in Table 1. The results are shown in Table 1.

Examples 8 to 10

PTFE fine powders were obtained in the same manner as Example 1 except that a 17-L stainless steel coagulation vessel equipped with a downward cone-shaped impeller and a baffle plate was used and that the washing step was changed as shown in Table 2. The results are shown in Table 2.

Comparative Example 1

PTFE fine powder was obtained in the same manner as Example 1 except that coagulation was carried out without any surfactant being added. The results are shown in Table 2.

Polymerization Example 2

PTFE aqueous dispersion was obtained by polymerization reaction according to example 5 of WO 2007/119829.

The resulting PTFE aqueous dispersion had a solids content of 31.4% by mass, average primary particle size of 0.36 μm, and a standard specific gravity (SSG) of 2.160.

Comparative Example 2

PTFE fine powder was obtained in the same manner as comparative example 1 except that the PTFE aqueous dispersion obtained in polymerization example 2 was used in lieu of the PTFE aqueous dispersion obtained in polymerization example 1 and that the temperature at coagulation and the temperature at drying were changed to 21° C. and 210° C., respectively. Average particle diameter, an apparent density, a compression ratio and an aggregate disintegration degree of the resulting PTFE fine powder were determined. The results are shown in Table 2.

Example 11

PTFE fine powder was obtained in the same manner as example 8 except that the PTFE aqueous dispersion obtained in polymerization example 2 was used in lieu of the PTFE aqueous dispersion obtained in polymerization example 1 and that the temperature at coagulation and the temperature at drying were changed to 21° C. and 210° C., respectively. Average particle diameter, an apparent density, a compression ratio and an aggregate disintegration degree of the resulting PTFE fine powder were determined. The results are shown in Table 2.

Polymerization Example 3

To a 6-L stainless steel (SUS316) autoclave equipped with a stainless steel (SUS316) anchor-type impeller and a thermostat jacket were added 3600 g deionized water, 180 g paraffin wax, 5.4 g of ($CF_3CF_2$—O—$CF_2CF_2$O—$CF_2COONH_4$), 0.108 g succinic acid and 0.0252 g oxalic acid, and the autoclave was heated to 70° C. while removing oxygen from the system by replacing three times with nitrogen gas and twice with TFE gas. The inner pressure was then brought to 2.70 MPa with TFE gas, and inner temperature was maintained at 70° C. with agitation.

While the content was agitated, 3.5 mg potassium permanganate dissolved in deionized water was continuously added at a constant rate, and TFE was continuously fed in order to maintain the pressure in the polymerization vessel at 2.7 MPa. When 184 g of TFE was consumed, 3.8 g of ($CF_3CF_2$—O—$CF_2CF_2$O—$CF_2COONH_4$) was added, and when 900 g of TFE was consumed, the remaining of the 3.5-mg potassium permanganate in deionized water was added at one time. When 1543 g of TFE was consumed, agitation and feeding of TFE were stopped, and gas in the autoclave was immediately exhausted to ordinary pressure to terminate the reaction.

The resulting PTFE aqueous dispersion had a solids content of 30.6% by mass, average primary particle size of 0.32 and a standard specific gravity (SSG) of 2.153.

Example 12

PTFE fine powder was obtained in the same manner as example 11 except that the PTFE aqueous dispersion obtained in polymerization example 3 was used in lieu of the PTFE aqueous dispersion obtained in polymerization example 1 and that the temperature at coagulation was changed to 23° C. Average particle diameter, an apparent density, a compression ratio and an aggregate disintegration degree of the resulting PTFE fine powder were determined. The results are shown in Table 2.

Polymerization Example 4

To a 6-L stainless steel (SUS316) autoclave equipped with a stainless steel (SUS316) anchor-type impeller and a thermostat jacket were added 3600 g deionized water, 180 g paraffin wax, 5.4 g of ($CF_3$—O—$CF(CF_3)CF_2$O—$CHFCF_2COONH_4$), 0.108 g succinic acid and 0.0252 g oxalic acid, and the autoclave was heated to 70° C. while removing oxygen from the system by replacing three times with nitrogen gas and twice with TFE gas. The inner pressure was then brought to 2.70 MPa with TFE gas, and inner temperature was maintained at 70° C. with agitation.

While the content was agitated, 3.5 mg potassium permanganate dissolved in deionized water was continuously added at a constant rate, and TFE was continuously fed in order to maintain the pressure in the polymerization vessel at 2.7 MPa. When 184 g of TFE was consumed, 3.8 g of ($CF_3$—O—$CF(CF_3)CF_2$O—$CHFCF_2COONH_4$) was added, and when 900 g of TFE was consumed, the remaining of the 3.5-mg potassium permanganate in deionized water was added at one time. When 1543 g of TFE was consumed, agitation and feeding of TFE were stopped, and gas in the autoclave was immediately exhausted to ordinary pressure to terminate the reaction.

The resulting PTFE aqueous dispersion had a solids content of 30.4% by mass, average primary particle size of 0.39 μm, and a standard specific gravity (SSG) of 2.154.

Example 13

PTFE fine powder was obtained in the same manner as example 12 except that the PTFE aqueous dispersion obtained in polymerization example 4 was used in lieu of the PTFE aqueous dispersion obtained in polymerization example 3. Average particle diameter, an apparent density, a compression ratio and an aggregate disintegration degree of the resulting PTFE fine powder were determined. The results are shown in Table 3.

Polymerization Example 5

To a 6-L stainless steel (SUS316) autoclave equipped with a stainless steel (SUS316) anchor-type impeller and a thermostat jacket were added 3600 g deionized water, 180 g paraffin wax, 5.4 g of ($CF_3$—O—$CF(CF_3)CF_2$O—$CF(CF_3)COONH_4$), 0.108 g succinic acid and 0.0252 g oxalic acid, and the autoclave was heated to 70° C. while removing oxygen from the system by replacing three times with nitrogen gas and twice with TFE gas. The inner pressure was then brought to 2.70 MPa with TFE gas, and inner temperature was maintained at 70° C. with agitation.

While the content was agitated, 3.5 mg potassium permanganate dissolved in deionized water was continuously added at a constant rate, and TFE was continuously fed in order to maintain the pressure in the polymerization vessel at 2.7 MPa. When 900 g of TFE was consumed, the remaining of the 3.5-mg potassium permanganate in deionized water was added at one time. When 1500 g of TFE was consumed, agitation and feeding of TFE were stopped, and gas in the autoclave was immediately exhausted to ordinary pressure to terminate the reaction.

The resulting PTFE aqueous dispersion had a solids content of 29.5% by mass, average primary particle size of 0.38 μm, and a standard specific gravity (SSG) of 2.149.

Example 14

PTFE fine powder was obtained in the same manner as example 12 except that the PTFE aqueous dispersion obtained in polymerization example 5 was used in lieu of the PTFE aqueous dispersion obtained in polymerization example 3. Average particle diameter, an apparent density, a compression ratio and an aggregate disintegration degree of the resulting PTFE fine powder were determined. The results are shown in Table 3.

Polymerization Example 6

To a 6-L stainless steel (SUS316) autoclave equipped with a stainless steel (SUS316) anchor-type impeller and a thermostat jacket were added 2960 g deionized water, 120 g paraffin wax and 4.4 g ammonium perfluorooctanoate, and the autoclave was heated to 85° C. while removing oxygen from the system by replacing three times with nitrogen gas and twice with TFE gas. Using TFE gas, the inner pressure was then brought to 0.70 MPa, 0.26 g chlorotrifluoroethylene (CTFE) was introduced and agitation at 280 rpm and inner temperature of 85° C. were maintained.

After the temperature in the polymerization vessel was stabilized, an aqueous solution of 12.3 mg ammonium persulfate in 20 g deionized water and an aqueous solution of 180 mg disuccinic acid peroxide in 20 g deionized water were pressed therein with TFE and the inner pressure of the autoclave was brought to 0.78 MPa. Reaction proceeded at an elevated rate, while the reaction temperature and agitation were maintained at 85° C. and 280 rpm, respectively. The inner pressure of the autoclave was always kept at 0.78 MPa with the continuous feed of TFE.

When 1300 g of TFE was consumed, a solution of 3.5 g CTFE from a small stock tank was pressed in the autoclave with TFE, and the reaction continued, with TFE being fed.

When 1430 g of TFE was consumed, agitation and feeding of TFE were stopped, and gas in the autoclave was immediately exhausted to ordinary pressure to terminate the reaction.

The resulting PTFE aqueous dispersion had a solids content of 32.2% by mass, average primary particle size of 0.24 μm, a standard specific gravity (SSG) of 2.177, and an amount of the modifying CTFE in the polymer was 0.23% by weight.

Comparative Example 3

PTFE fine powder was obtained in the same manner as comparative example 1 except that the PTFE aqueous dispersion obtained in polymerization example 6 was used in lieu of the PTFE aqueous dispersion obtained in polymerization example 1, that the temperature at coagulation was changed to 30° C. and that nitric acid was not added. Average particle diameter, an apparent density, a compression ratio and an aggregate disintegration degree of the resulting PTFE fine powder were determined. The results are shown in Table 3.

Example 15

PTFE fine powder was obtained in the same manner as example 1 except that the PTFE aqueous dispersion obtained in polymerization example 6 was used in lieu of the PTFE aqueous dispersion obtained in polymerization example 1, that the temperature at coagulation was changed to 30° C., that nitric acid was not added and that the type and amount of the surfactant added were changed as shown in Table 3. Average particle diameter, an apparent density, a compression ratio and an aggregate disintegration degree of the resulting PTFE fine powder were determined. The results are shown in Table 3.

Example 16

PTFE fine powder was obtained in the same manner as example 15 except that a 17-L stainless steel coagulation vessel equipped with a downward cone-shaped impeller and a baffle plate was used and that the washing step was changed as shown in Table 3. The results are shown in Table 3.

Example 17

PTFE fine powder was obtained in the same manner as example 16 except that the temperature in washing was changed to 40° C. Average particle diameter, an apparent density, a compression ratio and an aggregate disintegration degree of the resulting PTFE fine powder were determined. The results are shown in Table 3.

Examples 18 to 21

PTFE fine powders were obtained in the same manner as Example 16 except that the surfactant and its amount were changed as shown in Table 4. Average particle diameter, an apparent density, a compression ratio and an aggregate disintegration degree of the resulting PTFE fine powder were determined. The results are shown in Table 4.

TABLE 1

|  | Example 1 | Example 2 | Example 3 | Example 4 | Example 5 | Example 6 | Example 7 |
|---|---|---|---|---|---|---|---|
| Starting aqueous dispersion | Polymerization Example 1 | Polymerization Example 1 | Polymerization Example 1 | Polymerization Example 1 | Polymerization Example 1 | Polymerization Example 1 | Polymerization Example 1 |
| Impeller | Anchor | Anchor | Anchor | Anchor | Anchor | Anchor | Anchor |
| Adjusted specific gravity | 1.080 g/ml | 1.080 g/ml | 1.080 g/ml | 1.080 g/ml | 1.080 g/ml | 1.080 g/ml | 1.080 g/ml |
| Liquid volume | 8 L | 8 L | 8 L | 8 L | 8 L | 8 L | 8 L |
| Coagulation temperature | 22° C. | 22° C. | 22° C. | 22° C. | 22° C. | 22° C. | 22° C. |
| Agitation speed | 400 rpm | 400 rpm | 400 rpm | 400 rpm | 400 rpm | 400 rpm | 400 rpm |
| Nitric acid added | 6 ml | 6 ml | 6 ml | 6 ml | 6 ml | 6 ml | 6 ml |
| Surfactant added for coagulation | Nonion K204 | Noigen TDS-80C | Pronon 104 | Laol XA-60-50 | Laol XA-60-50 | Laol XA-60-50 | Laol XA-60-50 |
| Concentration of surfactant added (vs. polymer) | 500 ppm | 500 ppm | 500 ppm | 500 ppm | 100 ppm | 250 ppm | 1000 ppm |
| Amount of 1% surfactant aqueous solution added (g) | 57 | 57 | 57 | 57 | 11 | 29 | 114 |
| Duration of agitation after being water repellent | 1 min. | 1 min. | 1 min. | 1 min. | 1 min. | 1 min. | 1 min. |

TABLE 1-continued

|  |  | Example 1 | Example 2 | Example 3 | Example 4 | Example 5 | Example 6 | Example 7 |
|---|---|---|---|---|---|---|---|---|
| Washing conditions | Temperature of washing water | 25° C. | 25° C. | 25° C. | 25° C. | 25° C. | 25° C. | 25° C. |
|  | Liquid volume | 7 L | 7 L | 7 L | 7 L | 7 L | 7 L | 7 L |
|  | Rotational speed of agitation | 400 rpm | 400 rpm | 400 rpm | 400 rpm | 400 rpm | 400 rpm | 400 rpm |
|  | Washing time | 1 min. | 1 min. | 1 min. | 1 min. | 1 min. | 1 min. | 1 min. |
|  | Washing frequency | 2 times | 2 times | 2 times | 2 times | 2 times | 2 times | 2 times |
| Drying temperature |  | 155° C. | 155° C. | 155° C. | 155° C. | 155° C. | 155° C. | 155° C. |
| Apparent density (g/ml) |  | 0.473 | 0.477 | 0.470 | 0.473 | 0.467 | 0.477 | 0.473 |
| Average particle size (μm) |  | 590 | 560 | 480 | 550 | 560 | 520 | 570 |
| Height of cake (cm) |  | 4.370 | 4.370 | 4.240 | 4.260 | 4.280 | 4.240 | 4.260 |
| Apparent density of aggregate cake (g/ml) |  | 0.545 | 0.545 | 0.562 | 0.559 | 0.557 | 0.562 | 0.559 |
| Compression ratio |  | 1.15 | 1.14 | 1.20 | 1.18 | 1.19 | 1.18 | 1.18 |

|  | Vibration time (sec) | (Mass of fine powder passed through a sieve)/(Total mass of fine powder) × 100 (% by mass) | | | | | | |
|---|---|---|---|---|---|---|---|---|
| Aggregate disintegration degree | 0 | 0.0 | 0.0 | 0.0 | 0.0 | 0.0 | 0.0 | 0.0 |
|  | 5 | 7.2 | 3.6 | 3.0 | 10.8 | 7.2 | 6.4 | 11.0 |
|  | 10 | 11.6 | 8.2 | 7.4 | 16.2 | 13.8 | 13.6 | 14.6 |
|  | 15 | 13.2 | 11.6 | 11.6 | 18.4 | 17.0 | 17.8 | 18.6 |
|  | 20 | 15.2 | 13.8 | 14.2 | 20.8 | 19.4 | 20.2 | 24.6 |
|  | 25 | 19.8 | 16.0 | 16.2 | 23.2 | 20.4 | 22.4 | 32.2 |
|  | 30 | 21.8 | 17.6 | 17.4 | 24.8 | 21.8 | 24.2 | 37.6 |
|  | 40 | 28.4 | 19.6 | 20.6 | 34.0 | 25.2 | 30.8 | 46.2 |
|  | 50 | 34.2 | 21.8 | 24.0 | 42.4 | 32.6 | 38.8 | 51.4 |
|  | 60 | 42.2 | 22.6 | 28.2 | 49.6 | 37.8 | 45.6 | 55.2 |
|  | 70 | 47.8 | 26.8 | 32.4 | 55.8 | 41.8 | 51.2 | 58.6 |
|  | 80 | 53.0 | 32.4 | 36.0 | 61.0 | 45.8 | 56.0 | 64.0 |
|  | 90 | 57.6 | 37.8 | 38.8 | 65.8 | 48.8 | 59.8 | 66.6 |
|  | 100 | 61.0 | 41.6 | 40.8 | 70.0 | 52.2 | 63.2 | 68.8 |
|  | 110 | 63.8 | 44.2 | 42.6 | 72.8 | 55.0 | 66.0 | 70.8 |
|  | 120 | 65.8 | 45.8 | 44.2 | 75.0 | 58.0 | 68.8 | 72.8 |

TABLE 2

|  | Example 8 | Example 9 | Example 10 | Comparative Example 1 | Comparative Example 2 | Example 11 | Example 12 |
|---|---|---|---|---|---|---|---|
| Starting aqueous dispersion | Polymerization Example 1 | Polymerization Example 1 | Polymerization Example 1 | Polymerization Example 2 | Polymerization Example 2 | Polymerization Example 2 | Polymerization Example 3 |
| Impeller | Cone | Cone | Cone | Anchor | Anchor | Cone | Cone |
| Adjusted specific gravity | 1.080 g/ml | 1.080 g/ml | 1.080 g/ml | 1.080 g/ml | 1.080 g/ml | 1.080 g/ml | 1.080 g/ml |
| Liquid volume | 10 L | 10 L | 10 L | 8 L | 8 L | 10 L | 10 L |
| Coagulation temperature | 22° C. | 22° C. | 22° C. | 22° C. | 21° C. | 21° C. | 23° C. |
| Agitation speed | 600 rpm | 600 rpm | 600 rpm | 400 rpm | 400 rpm | 600 rpm | 600 rpm |
| Nitric acid added | 7.5 ml | 7.5 ml | 7.5 ml | 6 ml | 6 ml | 7.5 ml | 7.5 ml |
| Surfactant added for coagulation | Laol XA-60-50 | Laol XA-60-50 | Laol XA-60-50 | — | — | Laol XA-60-50 | Laol XA-60-50 |
| Concentration of surfactant added (vs. polymer) | 200 ppm | 200 ppm | 400 ppm | — | — | 200 ppm | 200 ppm |
| Amount of 1% surfactant aqueous solution added (g) | 29 | 29 | 57 | — | — | 29 | 29 |
| Duration of agitation after being water repellent | 3 min. | 3 min. | 3 min. | 1 min. | 1 min. | 3 min. | 3 min. |
| Washing conditions | Temperature of washing water | 25° C. | 40° C. | 40° C. | 25° C. | 25° C. | 25° C. | 25° C. |
|  | Liquid volume | 8.5 L | 8.5 L | 7 L | 7 L | 8.5 L | 8.5 L |
|  | Rotational speed of agitation | 600 rpm | 600 rpm | 600 rpm | 400 rpm | 400 rpm | 600 rpm | 600 rpm |
|  | Washing time | 1 min. | 1 min. | 1 min. | 1 min. | 1 min. | 1 min. | 1 min. |
|  | Washing frequency | 2 times | 2 times | 2 times | 2 times | 2 times | 2 times | 2 times |
| Drying temperature | 155° C. | 155° C. | 155° C. | 155° C. | 210° C. | 210° C. | 210° C. |
| Apparent density (g/ml) | 0.470 | 0.463 | 0.478 | 0.473 | 0.503 | 0.508 | 0.503 |
| Average particle size (μm) | 590 | 540 | 580 | 480 | 570 | 570 | 580 |

TABLE 2-continued

|  | | Example 8 | Example 9 | Example 10 | Comparative Example 1 | Comparative Example 2 | Example 11 | Example 12 |
|---|---|---|---|---|---|---|---|---|
| Height of cake (cm) | | 4.550 | 4.620 | 4.490 | 4.010 | 4.000 | 4.380 | 4.350 |
| Apparent density of aggregate cake (g/ml) | | 0.524 | 0.516 | 0.531 | 0.594 | 0.596 | 0.544 | 0.548 |
| Compression ratio | | 1.11 | 1.11 | 1.11 | 1.26 | 1.18 | 1.07 | 1.09 |
| | Vibration time (sec) | (Mass of fine powder passed through a sieve)/(Total mass of fine powder) × 100 (% by mass) | | | | | | |
| Aggregate disintegration degree | 0 | 0.0 | 0.0 | 0.0 | 0.0 | 0.0 | 0.0 | 0.0 |
| | 5 | 14.6 | 14.8 | 13.4 | 1.8 | 5.8 | 11.6 | 10.6 |
| | 10 | 21.0 | 21.2 | 20.2 | 7.6 | 12.8 | 17.2 | 19.2 |
| | 15 | 24.2 | 31.8 | 28.4 | 11.4 | 17.2 | 20.6 | 24.6 |
| | 20 | 31.2 | 42.2 | 40.2 | 15.4 | 20.6 | 23.2 | 28.4 |
| | 25 | 39.4 | 49.0 | 52.2 | 18.0 | 22.6 | 25.6 | 34.8 |
| | 30 | 46.6 | 54.8 | 61.4 | 19.4 | 25.2 | 33.4 | 39.2 |
| | 40 | 58.6 | 66.8 | 72.4 | 23.0 | 32.4 | 53.0 | 48.8 |
| | 50 | 65.4 | 73.8 | 79.6 | 26.2 | 38.0 | 64.2 | 59.0 |
| | 60 | 71.2 | 78.4 | 84.2 | 29.2 | 44.0 | 73.4 | 65.8 |
| | 70 | 75.4 | 82.0 | 87.8 | 31.4 | 47.8 | 80.2 | 71.4 |
| | 80 | 79.0 | 85.0 | 90.0 | 33.0 | 51.0 | 85.4 | 75.4 |
| | 90 | 81.2 | 87.0 | 91.8 | 34.8 | 54.6 | 89.4 | 78.8 |
| | 100 | 83.2 | 88.6 | 93.0 | 36.4 | 57.6 | 92.2 | 81.8 |
| | 110 | 85.0 | 90.0 | 94.0 | 37.8 | 59.8 | 94.2 | 84.2 |
| | 120 | 86.8 | 91.0 | 94.8 | 38.8 | 62.0 | 96.0 | 86.2 |

TABLE 3

|  | | Example 13 | Example 14 | Comparative Example 3 | Example 15 | Example 16 | Example 17 |
|---|---|---|---|---|---|---|---|
| Starting aqueous dispersion | | Polymerization Example 4 | Polymerization Example 5 | Polymerization Example 6 | Polymerization Example 6 | Polymerization Example 6 | Polymerization Example 6 |
| Impeller | | Cone | Cone | Anchor | Anchor | Cone | Cone |
| Adjusted specific gravity | | 1.080 g/ml | 1.080 g/ml | 1.080 g/ml | 1.080 g/ml | 1.080 g/ml | 1.080 g/ml |
| Liquid volume | | 10 L | 10 L | 8 L | 8 L | 10 L | 10 L |
| Coagulation temperature | | 23° C. | 23° C. | 30° C. | 30° C. | 30° C. | 30° C. |
| Agitation speed | | 600 rpm | 600 rpm | 400 rpm | 400 rpm | 600 rpm | 600 rpm |
| Nitric acid added | | 7.5 ml | 7.5 ml | — | — | — | — |
| Surfactant added for coagulation | | Laol XA-60-50 | Laol XA-60-50 | — | Laol XA-60-50 | Laol XA-60-50 | Laol XA-60-50 |
| Concentration of surfactant added (vs. polymer) | | 200 ppm | 200 ppm | — | 400 ppm | 400 ppm | 400 ppm |
| Amount of 1% surfactant aqueous solution added (g) | | 29 | 29 | — | 46 | 57 | 57 |
| Duration of agitation after being water repellent | | 3 min. | 3 min. | 1 min. | 1 min. | 3 min. | 3 min. |
| Washing conditions | Temperature of washing water | 25° C. | 25° C. | 25° C. | 25° C. | 25° C. | 40° C. |
| | Liquid volume | 8.5 L | 8.5 L | 7 L | 7 L | 8.5 L | 8.5 L |
| | Rotational speed of agitation | 600 rpm | 600 rpm | 400 rpm | 400 rpm | 600 rpm | 600 rpm |
| | Washing time | 1 min. | 1 min. | 1 min. | 1 min. | 1 min. | 1 min. |
| | Washing frequency | 2 times | 2 times | 2 times | 2 times | 2 times | 2 times |
| Drying temperature | | 210° C. | 210° C. | 155° C. | 155° C. | 155° C. | 155° C. |
| Apparent density (g/ml) | | 0.496 | 0.496 | 0.493 | 0.483 | 0.504 | 0.479 |
| Average particle size (μm) | | 580 | 590 | 500 | 490 | 480 | 520 |
| Height of cake (cm) | | 4.340 | 4.395 | 3.940 | 4.145 | 4.180 | 4.260 |
| Apparent density of aggregate cake (g/ml) | | 0.549 | 0.542 | 0.605 | 0.575 | 0.570 | 0.559 |
| Compression ratio | | 1.107 | 1.09 | 1.23 | 1.19 | 1.13 | 1.17 |
| Extrusion pressure at RR1500 (MPa) | | — | — | 49 | 50 | 49 | 51 |
| | Vibration time (sec) | (Mass of fine powder passed through a sieve)/(Total mass of fine powder) × 100 (% by mass) | | | | | |
| Aggregate disintegration degree | 0 | 0.0 | 0.0 | 0.0 | 0.0 | 0.0 | 0.0 |
| | 5 | 9.6 | 9.6 | 5.6 | 12.2 | 13.2 | 21.8 |
| | 10 | 16.0 | 16.8 | 14.0 | 18.2 | 27.6 | 40.8 |
| | 15 | 20.8 | 20.0 | 23.4 | 26.0 | 42.8 | 59.0 |
| | 20 | 24.2 | 24.6 | 24.6 | 33.6 | 51.8 | 70.0 |
| | 25 | 27.4 | 37.8 | 29.0 | 40.2 | 61.0 | 77.4 |
| | 30 | 34.2 | 46.6 | 36.8 | 44.2 | 68.0 | 81.8 |
| | 40 | 51.2 | 57.0 | 41.8 | 50.4 | 77.4 | 87.0 |
| | 50 | 62.8 | 65.6 | 47.8 | 56.8 | 83.2 | 91.4 |
| | 60 | 69.0 | 72.2 | 48.0 | 60.8 | 87.0 | 94.0 |
| | 70 | 74.0 | 79.4 | 52.2 | 64.8 | 89.8 | 95.8 |
| | 80 | 78.0 | 84.6 | 55.8 | 68.4 | 92.0 | 96.8 |
| | 90 | 81.6 | 88.2 | 58.0 | 72.0 | 93.6 | 97.4 |
| | 100 | 84.8 | 91.2 | 60.2 | 73.6 | 94.6 | 98.0 |

TABLE 3-continued

|  | Example 13 | Example 14 | Comparative Example 3 | Example 15 | Example 16 | Example 17 |
|---|---|---|---|---|---|---|
| 110 | 87.4 | 92.8 | 62.2 | 75.2 | 95.6 | 98.4 |
| 120 | 89.8 | 94.2 | 63.6 | 77.0 | 96.6 | 98.8 |

TABLE 4

|  |  | Example 18 | Example 19 | Example 20 | Example 21 |
|---|---|---|---|---|---|
| Starting aqueous dispersion | | Polymerization Example 6 | Polymerization Example 6 | Polymerization Example 6 | Polymerization Example 6 |
| Impeller | | Cone | Cone | Cone | Cone |
| Adjusted specific gravity | | 1.080 g/ml | 1.080 g/ml | 1.080 g/ml | 1.080 g/ml |
| Liquid volume | | 10 L | 10 L | 10 L | 10 L |
| Coagulation temperature | | 30° C. | 30° C. | 30° C. | 30° C. |
| Agitation speed | | 600 rpm | 600 rpm | 600 rpm | 600 rpm |
| Nitric acid added | | — | — | — | — |
| Surfactant added for coagulation | | Ammonium perfluorooctanoate | Ammonium perfluorooctanoate | $CF_3-O-CF(CF_3)CF_2O-CF(CF_3)COONH_4$ | Ammonium perfluorohexanoate |
| Concentration of surfactant added (vs. polymer) | | 400 ppm | 2000 ppm | 2000 ppm | 2000 ppm |
| Amount of 1% surfactant aqueous solution added (g) | | 57 | 285 | 285 | 285 |
| Duration of agitation after being water repellent | | 3 min. | 3 min. | 3 min. | 3 min. |
| Washing conditions | Temperature of washing water | 25° C. | 25° C. | 25° C. | 25° C. |
|  | Liquid volume | 8.5 L | 8.5 L | 8.5 L | 8.5 L |
|  | Rotational speed of agitation | 600 rpm | 600 rpm | 600 rpm | 600 rpm |
|  | Washing time | 1 min. | 1 min. | 1 min. | 1 min. |
|  | Washing frequency | 2 times | 2 times | 2 times | 2 times |
| Drying temperature | | 155° C. | 155° C. | 155° C. | 155° C. |
| Apparent density (g/ml) | | 0.504 | 0.508 | 0.508 | 0.500 |
| Average particle size (μm) | | 520 | 500 | 520 | 510 |
| Height of cake (cm) | | 4.050 | 4.300 | 4.100 | 4.050 |
| Apparent density of aggregate cake (g/ml) | | 0.588 | 0.554 | 0.581 | 0.588 |
| Compression ratio | | 1.17 | 1.09 | 1.14 | 1.18 |
| Extrusion pressure at RR1500 (MPa) | | 49 | 51 | 50 | 50 |
| Aggregate disintegration degree | Vibration time (sec) | (Mass of fine powder passed through a sieve)/(Total mass of fine powder) × 100 (% by mass) | | | |
|  | 0 | 0.0 | 0.0 | 0.0 | 0.0 |
|  | 5 | 14.6 | 16.1 | 12.5 | 12.2 |
|  | 10 | 23.8 | 28.1 | 22.0 | 22.4 |
|  | 15 | 37.8 | 46.6 | 36.5 | 36.4 |
|  | 20 | 47.0 | 58.6 | 48.2 | 46.8 |
|  | 25 | 55.2 | 66.0 | 58.5 | 55.4 |
|  | 30 | 64.0 | 74.9 | 66.4 | 62.4 |
|  | 40 | 72.6 | 86.4 | 74.1 | 71.4 |
|  | 50 | 80.5 | 92.4 | 81.2 | 77.4 |
|  | 60 | 85.6 | 94.1 | 85.4 | 81.6 |
|  | 70 | 89.2 | 95.2 | 88.2 | 85.4 |
|  | 80 | 91.2 | 96.0 | 90.9 | 87.8 |
|  | 90 | 93.4 | 96.6 | 93.1 | 89.6 |
|  | 100 | 95.2 | 97.2 | 95.7 | 91.0 |
|  | 110 | 96.6 | 97.5 | 96.8 | 91.8 |
|  | 120 | 97.8 | 97.7 | 97.2 | 92.4 |

Details for the surfactants specified in Tables 1 to 4 are as follows:

K204 (NOF Corporation)

Noigen TDS-80C (Dai-ichi Kogyo Seiyaku Co., Ltd.)

Pronon 104 (NOF Corporation)

Laol XA-60-50 (Lion Corporation)

The production process of the present invention is suitably applicable for a process of producing PTFE fine powder having superior handling characteristics. The obtained PTFE fine powder can be molded to sealing materials, filters, tubes, pipes, wire-coatings and the like by paste extrusion or calendering. The obtained PTFE fine powder can also be suitably applied for materials for stretch films, materials for porous articles, processing aids, anti-drip agents, unsintered tape, binders for batteries and the like.

EXPLANATION OF REFERENCE NUMERALS

1 Polytetrafluoroethylene fine powder
2 Cylindrical cup
3 Weight
4 Cylindrical cake of polytetrafluoroethylene fine powder
5 Sieve

The invention claimed is:

1. A process for producing a polytetrafluoroethylene fine powder,
the process comprising:
(1) a step of preparing an aqueous dispersion containing polytetrafluoroethylene, water and a surfactant (A);
(2) a step of initiating coagulation of the polytetrafluoroethylene in said aqueous dispersion by agitating said aqueous dispersion;
(3) a step of adding a surfactant (B) after the step (2);
(4) a step of terminating coagulation after the step (3);
(5) a step of collecting a wet powder of the polytetrafluoroethylene; and
(6) a step of drying the wet powder of the polytetrafluoroethylene.

2. The process according to claim 1, wherein the surfactant (B) is a nonionic surfactant.

3. The process according to claim 1, wherein, in the step (3), 1 ppm to 10% by mass of the surfactant (B) is added to the polymer in the aqueous dispersion.

4. A polytetrafluoroethylene fine powder obtained by the process according to claim 1.

5. A polytetrafluoroethylene fine powder consisting of a TFE homopolymer, wherein a standard specific gravity is 2.160 to 2.230; average particle size is 300 to 800 μm; apparent density is 0.40 to 0.52 g/ml; compression ratio is 1.20 or less; and aggregate disintegration degree with 50-sec vibration is 60% or more.

6. A polytetrafluoroethylene fine powder consisting of a TFE homopolymer, wherein a standard specific gravity is 2.130 to 2.160, average particle size is 300 to 800 μm; apparent density is 0.40 to 0.52 g/ml; compression ratio is 1.20 or less; and aggregate disintegration degree with 50-sec vibration is 40% or more.

7. A polytetrafluoroethylene fine powder consisting of a modified PTFE, wherein a standard specific gravity is 2.140 to 2.230; extrusion pressure at RR (Reduction Ratio) 1500 is 80 MPa or less; average particle size is 300 to 800 μm; apparent density is 0.40 to 0.52 g/ml; compression ratio is 1.20 or less; and aggregate disintegration degree with 50-sec vibration is 70% or more.

8. A polytetrafluoroethylene fine powder consisting of a modified PTFE, wherein a standard specific gravity is 2.140 to 2.230; extrusion pressure at RR (Reduction Ratio) 1500 is 60 MPa or less; average particle size is 300 to 800 μm; apparent density is 0.40 to 0.52 g/ml; compression ratio is 1.20 or less; and aggregate disintegration degree with 50-sec vibration is 70% or more.

* * * * *